Figure 4:
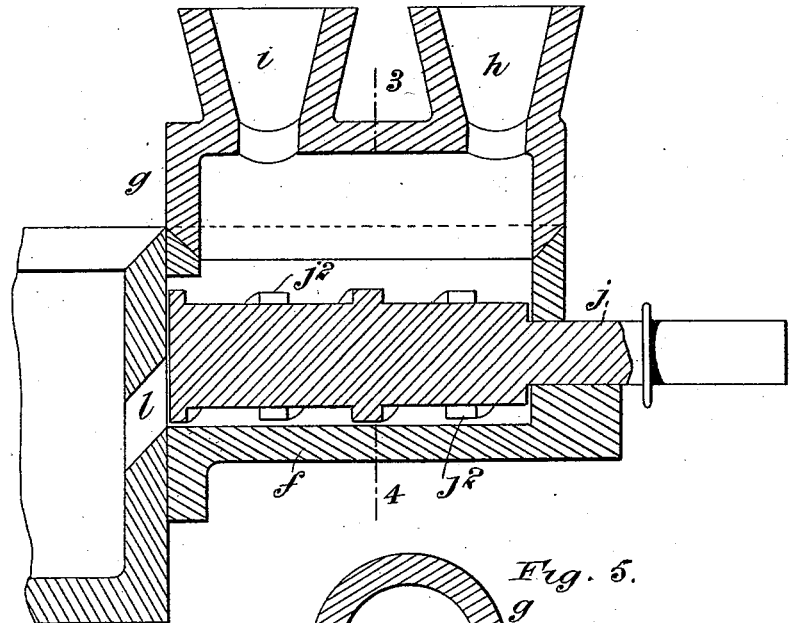

(No Model.) 2 Sheets—Sheet 1.
M. PRENTICE.
STILL FOR OBTAINING NITRIC ACID, &c.
No. 527,718. Patented Oct. 16, 1894.
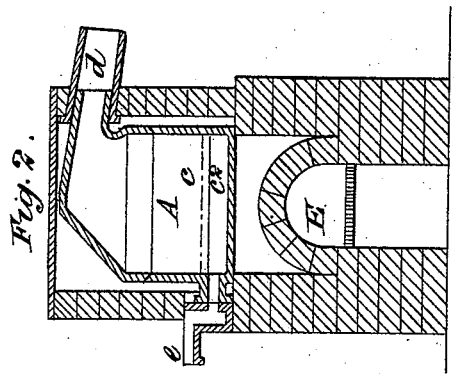
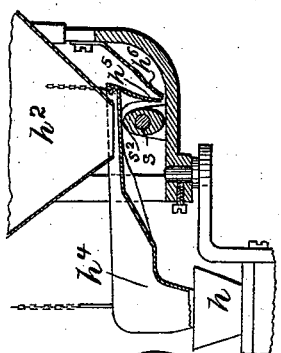
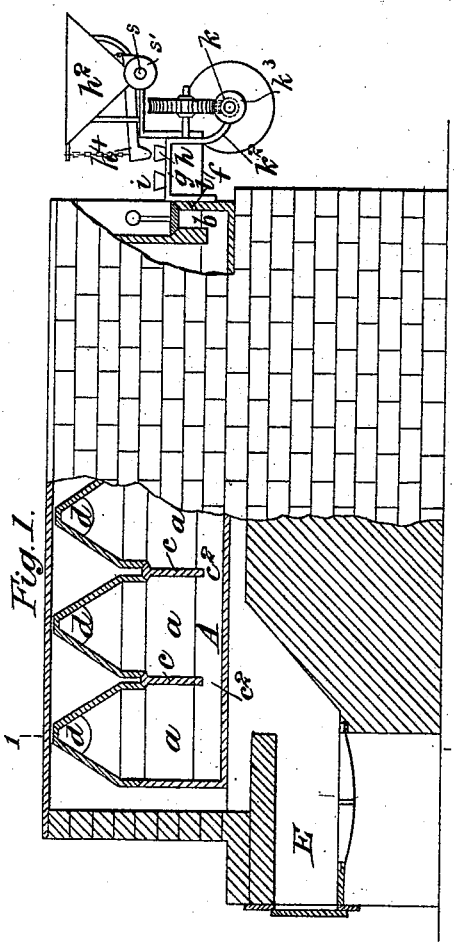
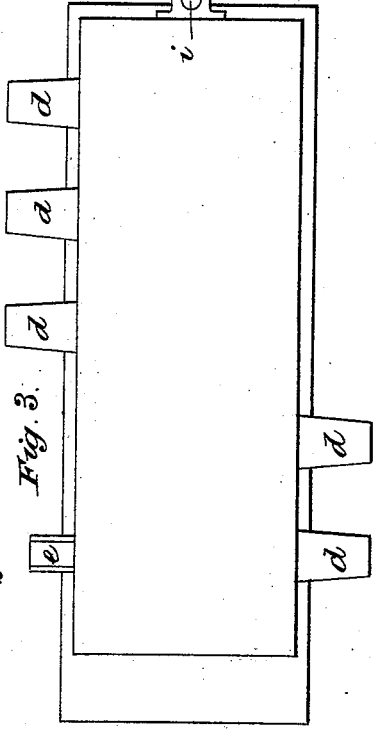

(No Model.) 2 Sheets—Sheet 2.

M. PRENTICE.
STILL FOR OBTAINING NITRIC ACID, &c.

No. 527,718. Patented Oct. 16, 1894.

Attest:—
Perro Lewis
Samuel N. Fisher

Inventor:—
Manning Prentice
by Pollok & Mauro
his attorneys

UNITED STATES PATENT OFFICE.

MANNING PRENTICE, OF STOWMARKET, ENGLAND.

STILL FOR OBTAINING NITRIC ACID, &c.

SPECIFICATION forming part of Letters Patent No. 527,718, dated October 16, 1894.

Application filed October 10, 1893. Serial No. 487,765. (No model.)

*To all whom it may concern:*

Be it known that I, MANNING PRENTICE, manufacturing chemist, a subject of the Queen of Great Britain and Ireland, residing at Woodfield, Stowmarket, in the county of Suffolk, England, have invented certain Improvements in Means or Apparatus for Distilling or Obtaining Volatile Constituents or Products, of which the following is a specification.
My invention has for its object to provide simple and efficient means or apparatus whereby distilling operations, or the obtainment of volatile constituents, or products, can be effected in a continuous manner, and so that, where required, constituents or products which are separated at different periods, or under different temperatures, can be separately obtained by a continuous process; and the invention relates more particularly to the provision of apparatus for carrying into effect the continuous process for the production of nitric acid, as described in my application filed October 10, 1893, Serial No. 487,766, and for the treatment of such substances as are introduced into the apparatus in a solid state.

According to my invention I provide a still, or apparatus, consisting of a vessel divided into a number of separate compartments or consisting of a number of chambers so constructed, or arranged, that the said compartments, or chambers, communicate with each other at their lower parts, so that the matter or matters, being distilled, passes or pass into the first compartment or chamber, by a suitable inlet, and then flows or flow from compartment or chamber, to compartments or chambers, and eventually the refuse or residue from which the volatile constituents have been distilled passes or pass off by a siphon or other suitable outlet. The said matter or matters, acts or act as a seal by which the upper portions of the compartments or chambers are kept separate from each other and the volatile constituents or products driven off in each compartment or chamber are led off separately by an outlet therefor provided at the upper part of each compartment or chamber. The matter or matters to be distilled can thus be passed continuously through the series of compartments or chambers and the volatile constituent or constituents or product or products be obtained continuously from the several compartments or chambers. The apparatus can be heated by any suitable heating medium, such as by fire heat or by steam outside the compartments or chambers, or passed through coils contained therein, and when different constituents or products are obtainable at different temperatures from the material or materials under treatment, the arrangement may be such that the compartments or chambers are subjected each to a temperature necessary to obtain from each the required constituent or product.

Figure 5:
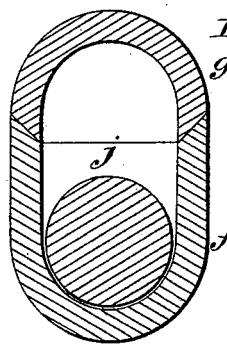
Figure 6:
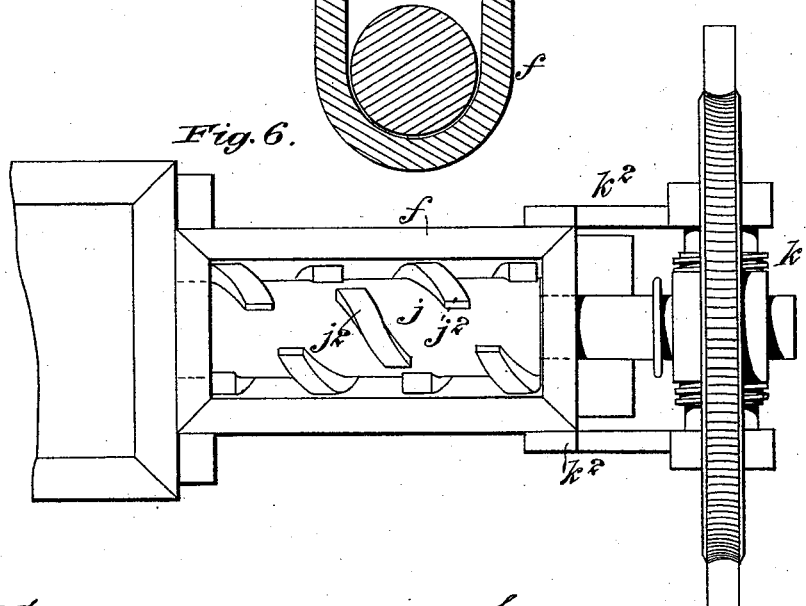

In the accompanying drawings Figure 1 represents in longitudinal section an apparatus constructed as arranged in accordance with my invention. Fig. 2 is a transverse section on the line 1, 2 of Fig. 1, and Fig. 3 is a plan. Fig. 4 is a longitudinal section of an arrangement for feeding the matter to be distilled into the distillatory apparatus. Fig. 5 is a section on the line 3, 4, Fig. 4. Fig. 6 is a plan with the cover removed, and Fig. 7 is a sectional detail of the hopper, trough and accessory parts.

A is the still or vessel provided with the inlet $b$ for the matter to be distilled and with the outlet $e$ for the refuse or residue to pass off.

$c$ are partitions which each extends from side to side of the still or vessel A and leave a space $c^2$ between its lower edge and the bottom of the still or vessel A dividing the upper part of the still or vessel A into compartments $a$.

I do not limit myself to the particular number of compartments shown.

$d$ are the outlets from each compartment $a$ for the volatile constituents driven off by the heat which is shown as being applied to the still or vessel A by the furnace E although I do not limit myself to that mode of applying the heat as it may be applied in any other suitable way.

The upper part of the still is shown as being inclosed in a surrounding casing constituting a hot air chamber into which the gases from the furnace pass. If it be desired to obtain products from each compartment which are driven off at different temperatures the compartments may be heated by providing each with separate furnaces or heating appliances or by so arranging the flue or flues from the furnace or furnaces that the heated products therefrom are as they pass in proximity to the several compartments at the requisite temperatures to impart to them the heat necessary to drive off the volatile constituents required from each.

The liquid being distilled is maintained at such a height in the still or vessel A that it seals the openings $c^2$ beneath the partitions $c$ keeping the upper parts of the compartments $a$ separate from each other so that the volatile constituents can be separately obtained at the outlets $d$ from each compartment. If the matter to be distilled be supplied by the inlet $b$ as the refuse or residue after distillation is drawn off at the outlet $e$ the process of distillation can be carried on continuously.

For mixing and feeding the material into the still I have shown a device consisting of a casing $f$ provided with a cover $g$ the meeting edges of the casing and cover being inclined to give a tight closure by the weight of the cover causing it to seat itself securely on the casing.

$h$ is the inlet by which the materials to be distilled are fed into the casing from the hopper $h^2$ by a spout or trough $h^4$ and $i$ is an outlet for the escape of any gas generated therein. The trough $h^4$ is supported from the hopper by flexible connections $h^3$ and is provided with a depending arm $h^5$ engaged at one side by a spring $h^6$. A shaft $s$ extending transversely to the trough in front of the arm $h^5$ is supported in suitable bearings on the frame work. This shaft carries at one end a pulley $s'$ through which motion is received from a pulley $k^3$ on the worm shaft $k$, and is also provided with a cam $s^2$ arranged to engage the arm $h^5$ which cam co-operates with the spring $h^6$ to oscillate the spout to feed the material to the mixer.

$j$ is a feed roll provided with feeders and breakers $j^2$ which are helically arranged and are shown as being non-continuous but they may be continuous if desired. The feed roll is rotated from any suitable motor or by hand. This may be effected by operating a worm $k$ mounted in brackets $k^2$ and gearing with a worm wheel on the axis of a feed roll projecting from the casings.

$l$ is the opening by which the materials are fed by the feed roll into the still.

In the employment of my apparatus to carry out the continuous process for the production of nitric acid, as described in my application heretofore referred to, the nitrate of soda and sulphuric acid after being first mixed in the mixer are fed thereby in a finely pulped condition through the inlet opening $b$ for the first chamber $a$, said opening $b$ being in the form of a pocket or compartment which is heated to a temperature intermediate between that of the mixer and the first chamber of the still. This temperature is such that while the heat tends to dissolve the nitrate in the acid there shall not be any considerable evaporation of the nitric acid. The hyponitric acid and chlorine produced from the impurities in the nitrate can be conducted to any suitable condenser before collecting the nitric acid. The mixture then flows from the pocket into the first chamber $a$ of the still, where it boils and gives off large quantities of nitric acid contaminated more or less with hyponitric acid. These vapors are by the first still head continuously conducted to suitable condensers, and when condensed may be run into a stone jar. The mixture of sulphuric acid, nitrate and sulphate of soda, flows from chamber to chamber boiling incessantly and giving off pure nitric acid. The liquid contained in each successive compartment has therefore a less percentage of nitric acid and a higher percentage of sulphate of soda than in the preceding compartments. The nitric acid produced will be found to differ in density, the strongest being collected from the first still head and the weakest from the last. The mixture of sulphuric acid and sulphate of soda with the small remaining quantity of nitrate of soda or nitric acid flows into the last chamber of the still. Here the temperature is much higher than in the preceding compartments and the mixture boils vigorously giving off the remaining acid with vapors of water and some sulphuric acid. These are continuously conducted by the last still head to appropriate condensers. The continuous collection of these is a valuable feature of the process.

I do not limit myself to the precise details shown in the drawings as it will be evident that the construction may be modified. For example the compartments $a$ may be made up of separate chambers with pipes or passages between each equivalent to the passages $c^2$.

Having now particularly described the nature of my said invention and in what manner the same is to be performed, I declare that what I claim is—

In a still or apparatus for distilling or obtaining volatile products or constituents from a mixture containing solid material, the combination with a series of compartments or chambers provided at one end of the series with an inlet for the matter to be distilled and at the other end with an outlet therefor, the compartments or chambers constituting the series being successively connected near the bottoms thereof by pipes or passages through which the matter under distillation passes on its way from the inlet to the outlet, so as to seal the said pipes or passages and constitute in each chamber a separate space, above the said matter, from which the volatile constituents or products can be obtained, of a mixer or feeder for feeding the mixture composed partly of solid material to the inlet opening, substantially as described.

In testimony whereof I have signed my name to this specification in the presence of two subscribing witnesses.

MANNING PRENTICE.

Witnesses:
EDWARD C. HAMMOND,
WILLIAM T. UPTON,
Both of 47 Lincoln's Inn Fields, London, W. C.